April 19, 1949.   J. L. GREENSTEIN ET AL   2,467,667
FOUR COMPONENT LENS SYSTEM FOR
CORRECTING CURVATURE OF FIELDS
Filed July 11, 1946

INVENTORS.
JESSE L. GREENSTEIN
LOUIS G. HENYEY

BY *M. A. Hayes*

ATTORNEY

Patented Apr. 19, 1949

2,467,667

UNITED STATES PATENT OFFICE 2,467,667

FOUR COMPONENT LENS SYSTEM FOR CORRECTING CURVATURE OF FIELD

Jesse L. Greenstein and Louis G. Henyey, Williams Bay, Wis., assignor to the United States of America as represented by the Secretary of the Navy Application July 11, 1946, Serial No. 682,750

1 Claim. (Cl. 88—57)

This invention relates to lens systems and more particularly to those for correcting curvature of field in the image plane.

It has been found with certain lens arrangements, such as in a complex submarine periscope, the image formed is highly curved. For instance, if a simple camera lens is set after the eye piece of a conventional submarine periscope (and if that lens does not introduce any of its own aberrations) the effective radius of the field is in the neighborhood of 35 millimeters. If the camera is focused for the center of the field the curvature of field results in an out of focus image of about 0.35 millimeter size at an apparent field of 18° (the field of a conventional periscope is about 24° in radius). The natural curvature of field, called the Petzval curvature, $P_z$, arises even when the astigmatism is zero, because of the dominantly positive character of the lenses in a periscope. A positive lens has positive $P_z$; in periscopes it is not usually possible to eliminate the $P_z$.

The object of this invention is to provide an objective lens system which will correct not only its own curvature of field but an additional curvature of field such as that arising in a periscope.

The invention also resides in certain novel features of optical structure and arrangement which facilitate the carrying out of the foregoing object.

These results are obtained in the present device by using very steep divergent surfaces at points in the lens system where the bundle of rays is small and by placing the convergent surfaces at large heights on the bundle.

Other objects and advantages of the invention will become apparent from the following detailed description taken in connection with the accompanying drawings in which.

Figure 1:
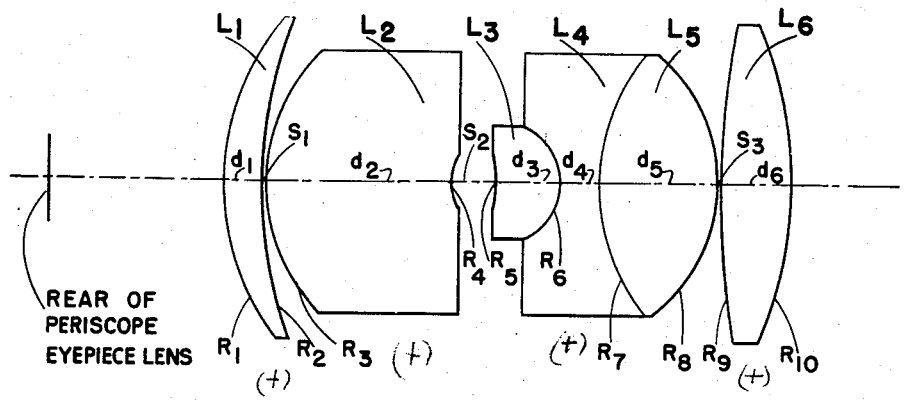
Figure 1 shows an axial cross section of a lens system of the present invention.

While the invention is susceptible of various modifications and alternative arrangements, we have shown in the drawings and will herein describe in detail the preferred embodiments. It is to be understood, however, that we do not intend to limit the invention by such disclosure for we aim to cover all modifications and alternative arrangements falling within the spirit and scope of the invention as defined in the appended claim.

In Figure 1 the first or front element of the lens system which faces the rear vertex of the eye piece of the telescope is a collective lens $L_1$ having a convex face $R_1$, a thickness $d_1$, and a concave face $R_2$, which is directed to the center of the system. The second lens element $L_2$ is separated from the first by an air space $s_1$ and has its convex face $R_3$ facing toward the first element. The second element is of thickness $d_2$ and its rearwardly directed face $R_4$ takes up only a small central portion of the total cross section of the element. The third lens element consists of 3 lenses, the first of which $L_3$ has its small concave face $R_5$ directed forwardly and separated from the second element by an air space $s_2$. This face $R_5$ takes up only the central portion of the lens and has a diameter similar to that of $R_4$. Lens $L_3$ is smaller in diameter than lens $L_4$ and has a thickness $d_3$. Its convex face $R_6$ is positioned in lens $L_4$. Lens $L_4$ has a center thickness $d_4$ and a rearwardly directed concave face $R_7$ which engages the forwardly directed face of lens $L_5$ which has a thickness $d_5$ and a rear convex surface $R_8$. The fourth lens element $L_6$ is separated from the third by an air space $s_3$. One convex face $R_9$ faces forward. It has a thickness $d_6$ and the rear convex face $R_{10}$ faces toward the film.

Optical data for the form of lens shown in Figure 1 is as follows:

EXAMPLE

| Lens element | Radius | Thickness and Separation | Diameter at curved surface |
|---|---|---|---|
| Rear of periscope eye-lens | | 17.2 mm. | Mm. |
| | $R_1=+24.7$ mm. | | 31 |
| $L_1$ | | $d_1=4.0$ | 31 |
| | $R_2=+44.1$ mm. | | |
| | | $s_1=0.1$ | |
| | $R_3=+17.26$ | | |
| $L_2$ | | $d_2=18.0$ | 25 |
| | $R_4=+5.21$ | | 5 |
| | | $s_2=4.0$ | |
| | $R_5=-12.52$ | | 5 |
| $L_3$ | | $d_3=6.5$ | 11 |
| | $R_6=-5.89$ | | |
| $L_4$ | | $d_4=3.7$ | 25 |
| | $R_7=+20.0$ | | |
| $L_5$ | | $d_5=11.8$ | 25 |
| | $R_8=-16.26$ | | |
| | | $s_3=0.1$ | |
| | $R_9=+83.4$ | | |
| $L_6$ | | $d_6=7.0$ | 31 |
| | $R_{10}=-38.5$ | | 31 |
| Approximate back focus | | 47.3 | |

Glasses

| | Index of refraction | Reciprocal dispersion |
|---|---|---|
| $L_1L_6$ | 1.517 | 64.5 |
| $L_2L_4$ | 1.617 | 36.6 |
| $L_3L_5$ | 1.611 | 58.8 |

This lens has an equivalent focal length of 50 mm.

As may be seen from this description and the elements in the example, the exterior elements $L_1$ and $L_6$ have convergent surfaces which are placed at large heights on the bundle of rays and admit a large bundle of rays. Due to this convergent action, the steeply divergent surfaces $R_4$ and $R_5$ may be of relatively small diameter, yet transmit rays at all the field angles supplied by the periscope. By using these divergent surfaces, large negative $P_z$ can be obtained at the expense of relatively small loss in positive bending of the rays. Due to the convergent surfaces being placed at large heights on the bundle, a net positive bending of the rays is possible along with the strong negative $P_z$. Other aberrations are controllable and the astigmatism and lateral color of the preceding telescope can also be altered in the camera lens. A field flattening camera lens according to the present principles corrects its own $P_z$ and two and a half times as much more $P_z$ arising in the periscope.

It will be noted that the outer elements have a lower index of refraction than the inner and that the thicknesses of inner element $L_2$ and compound inner element $L_3$, $L_4$ and $L_5$ are substantially thicker than those at the outer elements.

Figure 2:
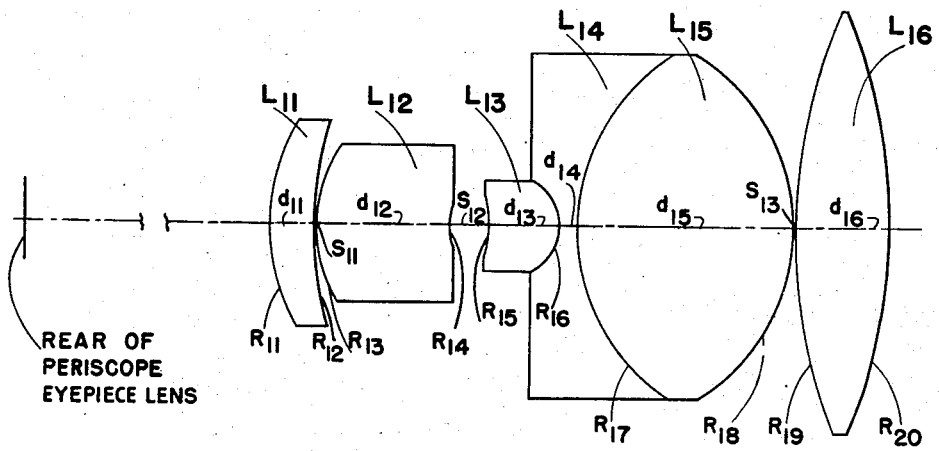
Figure 2 shows a modification of the lens system.

A second example of a suitable lens shown in Figure 2 is as follows:

| Lens element | Radius | Thickness and Separation | Diameter at curved surface |
|---|---|---|---|
| Rear of periscope eyelens. | | 31.5 mm | Mm. |
| $L_{11}$ | $R_{11}=+20.4$ mm. | $d_{11}=4.5$ | 20 |
| | $R_{12}=+36.2$ | $s_{11}=0.1$ | 20 |
| $L_{12}$ | $R_{13}=+14.31$ | $d_{12}=12.7$ | 15 |
| | $R_{14}=+6.61$ | $s_{12}=3.7$ | 4 |
| $L_{13}$ | $R_{15}=-12.44$ | $d_{13}=6.5$ | 6 |
| $L_{14}$ | $R_{16}=-5.01$ | $d_{14}=1.9$ | 9.6 |
| $L_{15}$ | $R_{17}=+20.4$ | $d_{15}=21.4$ | 34 |
| | $R_{18}=-20.4$ | $s_{13}=0.1$ | 34 |
| | $R_{19}=+59.7$ | | |
| $L_{16}$ | $R_{20}=-59.7$ | $d_{16}=9.0$ | 42 |
| Approximate back focus. | | 40.1 | 42 |

Glasses

| | Index of refraction | Reciprocal dispersion |
|---|---|---|
| $L_{11}$ $L_{16}$ | 1.517 | 64.5 |
| $L_{12}$ $L_{13}$ $L_{15}$ | 1.611 | 58.8 |
| $L_{14}$ | 1.617 | 36.6 |

This lens has an equivalent focal length of 50 mm., a relative aperture of f/12, and covers a field of 48° diameter on a flat film. The lenses are adapted for mounting on a 35 mm. camera.

What is claimed is:

In a field-flattening lens system of 50 mm. focal length and f/12 aperture for correcting the curvature of a field of a preceding optical system comprising lens elements having substantially the numerical data set forth in the following table wherein $L_1$, $L_2$, . . . designate successive elements counting from the preceding optical system, $R_1$, $R_2$, . . . radius of said elements, $d_1$, $d_2$, . . . thickness and $s_1$, $s_2$, . . . separation of said elements having index of refraction and reciprocal of dispersion values as follows:

| Element | Radius | Thickness and Separation | Index of Refraction | Reciprocal of Dispersion |
|---|---|---|---|---|
| | | 17.2 mm. to preceding element | | |
| $L_1$ | $R_1=+24.7$ mm. | $d_1=4.0$ | 1.517 | 64.5 |
| | $R_2=+44.1$ mm. | $s_1=0.1$ | | |
| | $R_3=+17.26$ | | | |
| $L_2$ | $R_4=+5.21$ | $d_2=18.0$ | 1.617 | 36.6 |
| | | $s_2=4.0$ | | |
| | $R_5=-12.52$ | | | |
| $L_3$ | $R_6=-5.89$ | $d_3=6.5$ | 1.611 | 58.8 |
| $L_4$ | $R_6$ $R_7$ $R_7=+20$ | $d_4=3.7$ | 1.617 | 36.6 |
| $L_5$ | $R_8=-16.26$ | $d_5=11.8$ | 1.611 | 58.8 |
| | $R_9=+83.4$ | | | |
| $L_6$ | $R_{10}=-38.5$ | $d_6=7.0$ | 1.517 | 64.5 |

JESSE L. GREENSTEIN.
LOUIS G. HENYEY.

REFERENCES CITED

The following references are of record in the file of this patent:

UNITED STATES PATENTS

| Number | Name | Date |
|---|---|---|
| 2,130,760 | Warmisham | Sept. 20, 1938 |
| 2,175,518 | Djian | Oct. 10, 1939 |
| 2,250,337 | Warmisham | July 22, 1941 |
| 2,252,682 | Aklin | Aug. 19, 1941 |
| 2,363,788 | Gottlieb | Nov. 28, 1944 |

FOREIGN PATENTS

| Number | Country | Date |
|---|---|---|
| 423,468 | Great Britain | Feb. 1, 1935 |